United States Patent [19]

Liu

[11] Patent Number: 5,458,012

[45] Date of Patent: Oct. 17, 1995

[54] DRIVE FOR A CRYSTAL BALL FOR MOVING A FIGURE UPWARDLY AND DOWNWARDLY

[76] Inventor: Jian H. Liu, No. 2, Alley 202, Kao Fen Rd., Hsin-Chu City, Taiwan

[21] Appl. No.: 279,025

[22] Filed: Jul. 22, 1994

[51] Int. Cl.⁶ .......................... G09F 19/08; F16H 37/16
[52] U.S. Cl. .................... 74/52; 74/56; 40/409; 40/411; 366/289; 446/332
[58] Field of Search ................ 74/52, 56; 475/11; 40/406, 409, 410, 411; 472/27, 29; 446/332, 352, 366; 464/157, 162, 185; 366/287–289, 241, 255, 256

[56] References Cited

U.S. PATENT DOCUMENTS 5,134,795  8/1992  Wong ................................ 40/411

Primary Examiner—Rodney H. Bonck
Assistant Examiner—Troy Grabow
Attorney, Agent, or Firm—Larson and Taylor

[57] ABSTRACT

The present invention provides a crystal ball which move upwardly and downwardly, wherein the convex surface of the planetary gears which is used to drive the revolving disk is a bevel to form a bulgy state, and a mantle surrounding said bulgy convex surface is on the upper side of the revolving disk; and the dynamic phenomena including revolution, rotation and moving upwardly and downwardly performed by the doll inserted into said mantle are driven by the rotation of the revolving disk and the planetary gears.

5 Claims, 4 Drawing Sheets

5,458,012

DRIVE FOR A CRYSTAL BALL FOR MOVING A FIGURE UPWARDLY AND DOWNWARDLY

FIELD OF THE INVENTION

The present invention relates to the drive for a crystalline or crystal ball which can move a figure inside the ball upwardly and downwardly.

BACKGROUND OF THE INVENTION

In the prior art, Applicant's U.S. Pat. No. 5,134,795, for example, there is disclosed a relative structure in which the dynamic features or phenomena of dolls constructed on the convex surface of planetary gears are performed by the rotation and the revolution of the planetary gears. On the structure and effectiveness of the aforementioned applicant, the dolls only present one dynamic feature, such design obviously not complying with a market requesting diversified motions.

SUMMARY OF THE INVENTION

In view of the need applicant described above, the inventor of this invention made a modification to the aforementioned structure. The variation of the dynamic features of a doll including revolution, rotation and moving upwardly and downwardly are driven by the rotation of the revolving disk and the planetary gears.

In a preferred embodiment the drive includes a planetary gear having an upright member with a bulgy bevelled surface which is used to drive a revolving disk. A mantle surrounding said upright members is mounted on the upper side of the revolving disk. The lower end of a longitudinal stick mounting a doll on the upper end is in contact with the bulgy bevel and is inserted into the mantle on the respective location to the rotatable circumference of the upright member on the planetary gear. The dynamic phenomena including revolution, rotation and moving upwardly and downwardly performed by the doll is driven by the rotation of the revolving disk and the planetary gears. The surface of the planetary gear which is used to drive the revolving disk is a bevel for forming a bulgy state, and a mantle surrounding said bulgy surface is on the upper side of the revolving disk. The end of the longitudinal stick with doll which is in contact with said bulgy bevel is inserted into the mantle on the respective location to the rotatable circumference of the convex surface on the planetary gear;

DETAILED DESCRIPTION OF THE PREFERRED EMBODIMENT

The novel features of the invention are set forth with particularity in the appended claims. The invention will be best understood from the following description when read in conjunction with the accompanying drawings in which like numerals denote like elements throughout the several views and any applicable embodiments.

Figure 1:
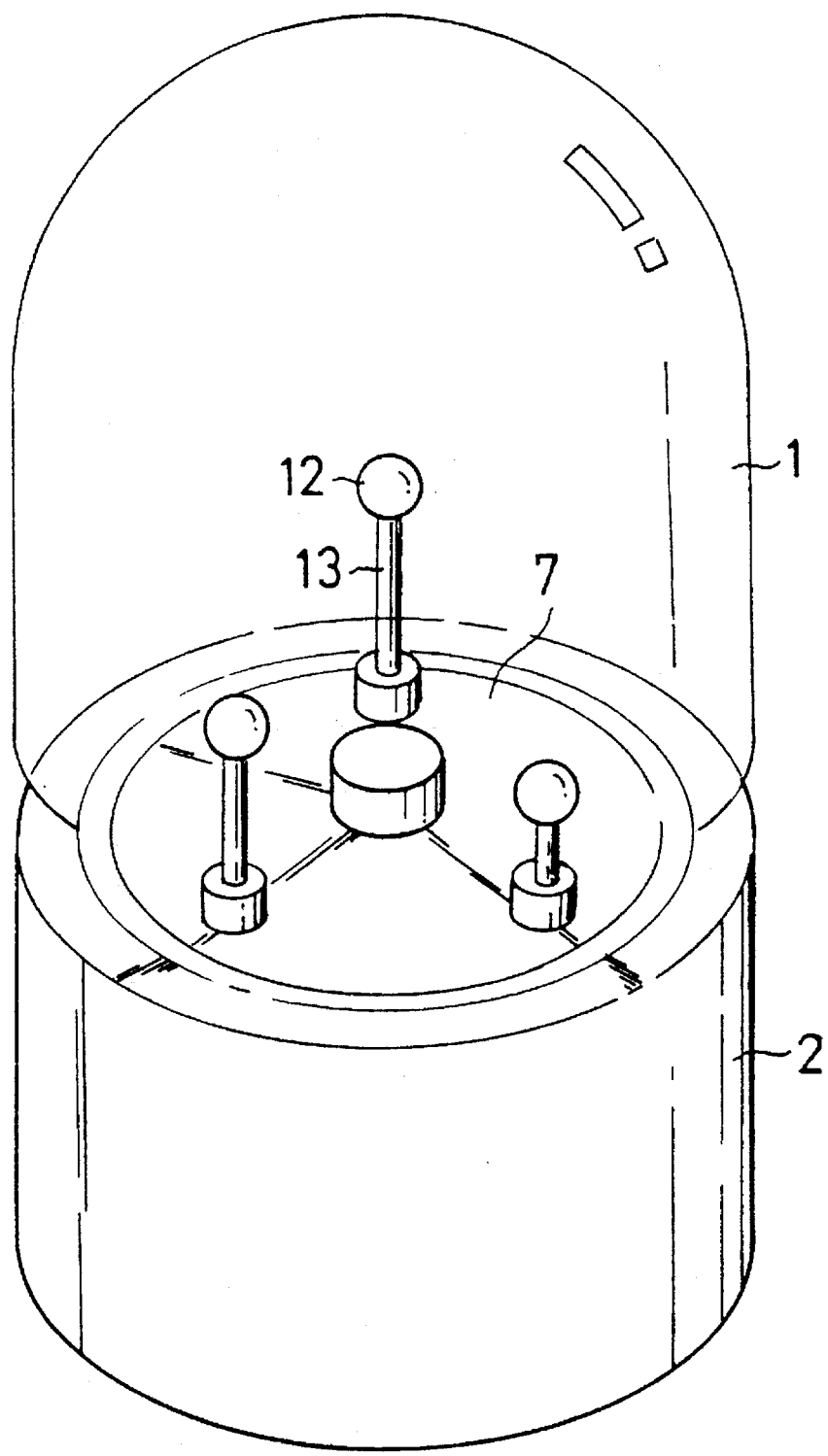
FIG. 1 shows a perspective view of the crystal ball.
Figure 2:
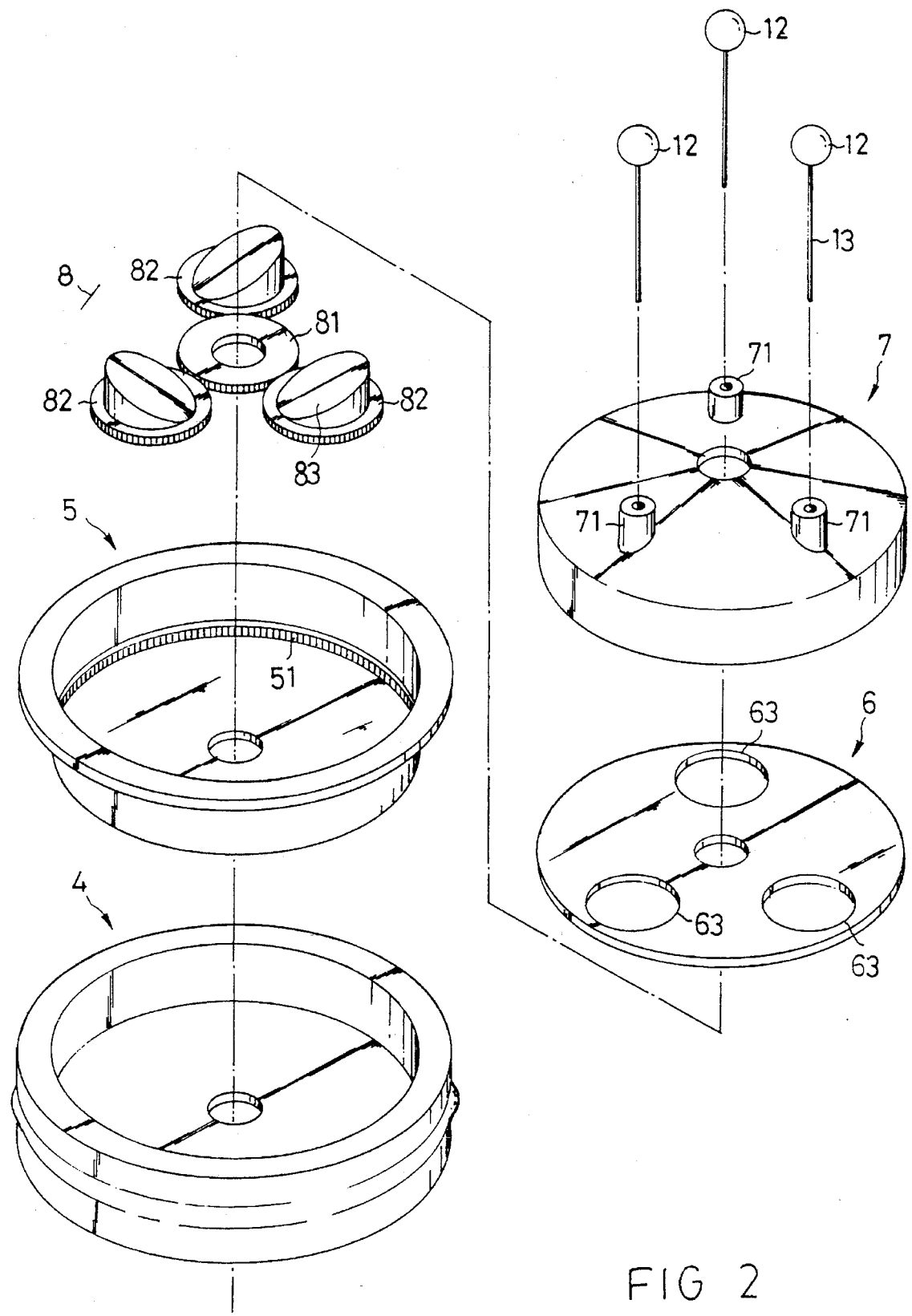
FIG. 2 shows a perspective view of the construction according to the invention.
Figure 3:
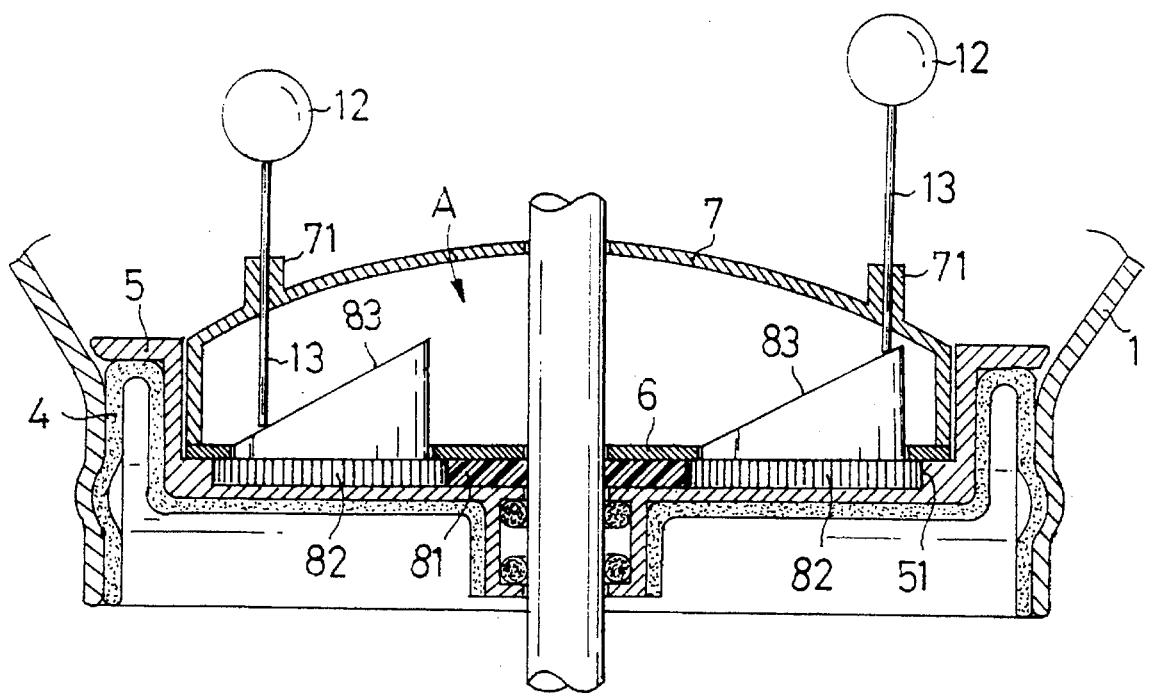
FIG. 3 shows a sectional view of this invention.
Figure 4:
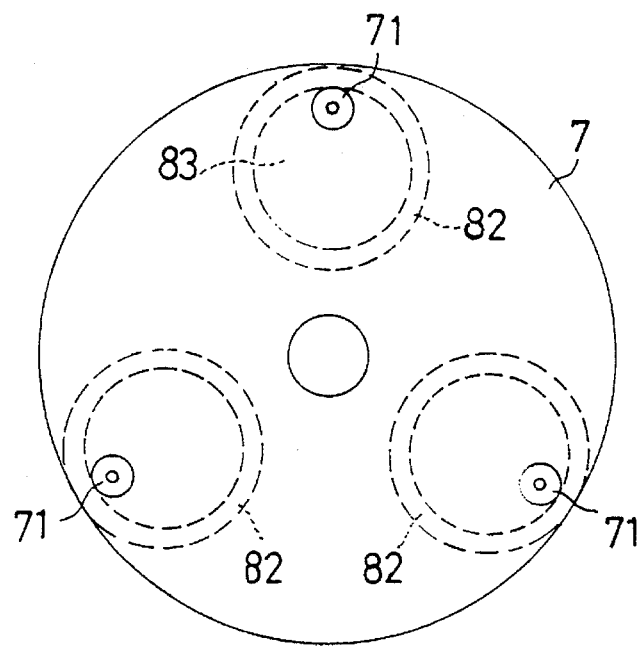
FIG. 4 shows a top view of the location of the longitudinal stick relative to the convex plane of the planetary gears.

Shown in FIG. 1 is a crystalline or crystal ball according to the present invention, in which a glass cover 1 filled with liquid is mounted above a wood base 2, and the variation of dynamic phenomena of revolution, rotation, moving upwardly and downwardly of a doll 12 inside glass cover 1 are achieved by the apparatus described hereinafter. In order to achieve the aforementioned expected function, as shown in FIGS. 1, 2, and 3, a rubber plug 4 having a recessed or concave center is engaged with a neck on the lower part of glass cover 1 so that the interior of glass cover 1 has a hermetic seal. An annular ring gear 51 is formed below the interior of a recessed or concave fixed base 5 that is mounted in the recessed center of rubber plug 4. A planetary gearing 8 is constructed with a central gear 81 and a plurality of planetary gears 82, and is located within the annular ring gear 51 of the fixed base so that planetary gears 82 are engaged with ring gear 51. Mounted on the upper surface of planetary gears 82 is a cylindrical upright member 83 which extends an appropriate height upwardly and which has an upper surface that is designed to be a bevel. Moreover, on the upper surface of said planetary gearing 8 includes a revolving disk 6, and the convex surface of the revolving disk with respect to said planetary gear 82 is installed with bores 63. Therefore, the revolving disk 6 is driven by the rotation and revolution of the planetary gears in accordance with the attachment between the bores and the convex surface as the central gear rotates. A mantle 7 is mounted on revolving disk 6 and forms a space A therebetween which contains the upright members 83 of said planetary gears. On the upper surface of said mantle 7 are three longitudinal bulgy cylinders 71 which is relative to the circumference area of upright members 83 on the planetary gears and provides for the longitudinal stick 13 of doll 12 to insert into, as illustrated in FIG. 4, so that the end of the longitudinal sticks 13 which penetrate the bulgy cylinders 71 can be in contact with the convex surface 83 of the planetary gear 82. The revolving disk is rotatable driven synchronously by the rotation and the revolution of the planetary gears, the longitudinal sliding or vertical reciprocal motion of the longitudinal stick 13 from the bottom to the top is driven by the bevelled surface of upright member 83 of the rotating planetary gear 82. The sliding from the top to the bottom of stick 13 on the bevelled surfaces is driven by the weight of doll 12 and longitudinal stick 13, so that the doll 12 will perform the variation of dynamic phenomena of revolution, moving upwardly and downwardly.

Figure 5:
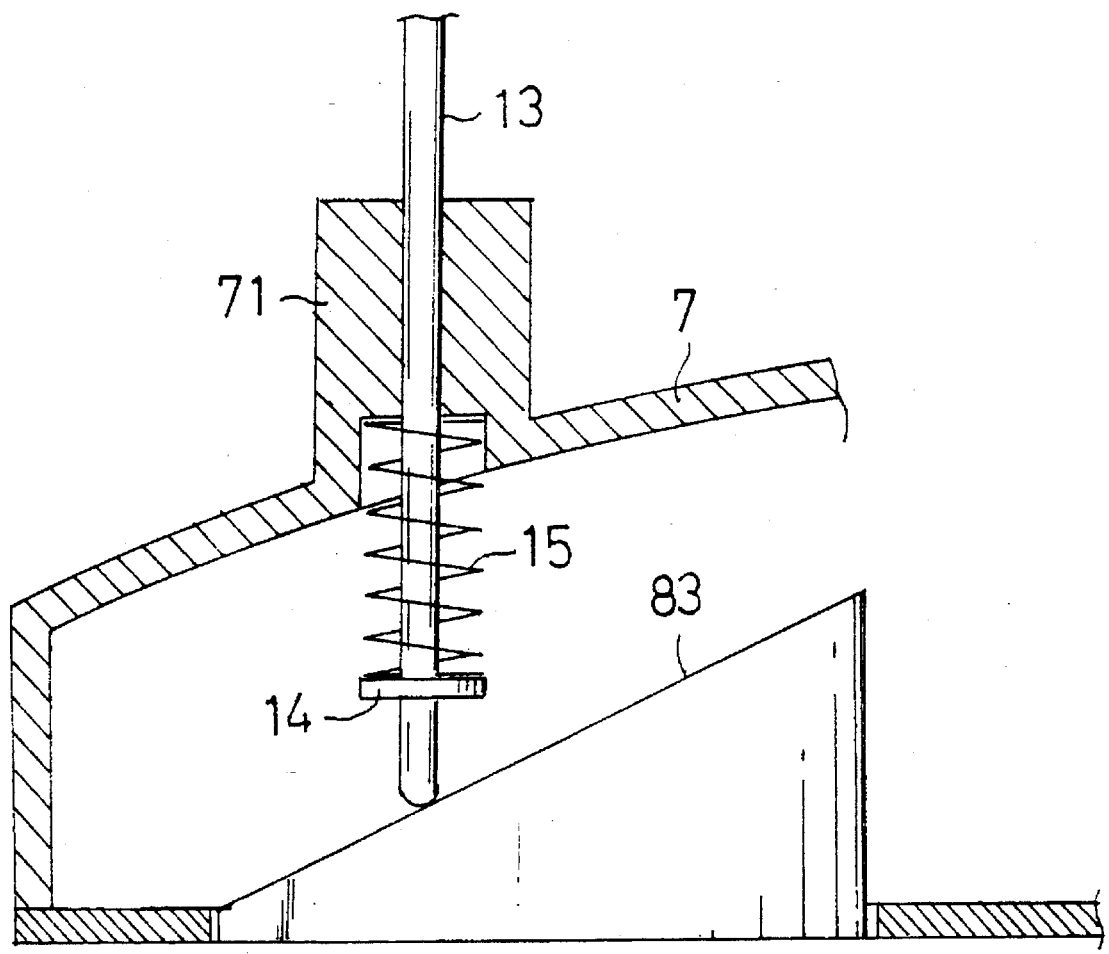
FIG. 5 is a second embodiment of the longitudinal stick which includes a spring according to the present invention.

Because the sliding of doll 12 and longitudinal stick 13 from the top to the bottom is caused by their own weight, in order to prevent interference to the sliding between longitudinal stick and bulgy cylinder resulting from the influence of reduced precision during the manufacture of the related components making longitudinal stick 13 unable to slide downwardly by its own weight, a spring 15 is installed between the bottom surface of the bulgy cylinder and the bulgy edge of the longitudinal stick 13. This provides a downward elasticity of longitudinal stick as illustrated in FIG. 5 which makes the sliding of the longitudinal stick and the doll from the top to the bottom reliable.

In summary, the convex surface of the planetary gears according to the present invention is a bevel to form a bulgy state, and the end of the longitudinal stick with doll which is in contact with said bulgy bevel is inserted into the mantle on the respective location to the rotatable circumference of the convex surface on the planetary gear. The dynamic phenomena or features thus includes revolution, rotation and moving upwardly and downwardly performed by the doll when driven by the rotation of the revolving disk and the planetary gears.

What is claimed is:

1. A drive for vertically reciprocating an object mounted on a longitudinal stick, the drive comprising a planetary gearing including a planetary gear having an upper side and an upright member extending upwardly from said planetary gear upper side and having a bevelled upper surface;

a revolving disk containing a bore through which said upright member extends; and a mantle mounted on said revolving disk and having an upper surface, said mantle defining a space therebelow in which said upright member on said planetary gear is located; and a bulgy cylinder mounted to said upper surface of said mantle corresponding to said upright member on said planetary gears, said bulgy cylinder having an opening through which the longitudinal stick mounting the object is inserted so that the end of the longitudinal stick is in contact with said beveled upper surface of said upright member of said planetary gear.

2. A drive as claimed in claim 1, wherein said drive is for a crystal ball, said crystal ball including a rubber plug having a recessed central portion and a fixed base, said fixed base being engaged with the recessed central portion of said rubber plug.

3. A drive as claimed in claim 1, wherein the bottom of the longitudinal stick slides from the top to the bottom of said bevelled upper surface of said upright member as said planetary gearing is rotated as a result of the weight of the object and the longitudinal stick.

4. A drive as claimed in claim 1, wherein the longitudinal stick includes a bulgy edge on a bottom portion thereof;

and further including a spring mounted between the bottom face of said bulgy cylinder and the bulgy edge of the longitudinal stick, wherein the bottom of the longitudinal stick slides from the top to the bottom of said bevelled upper surface of said upright member as said planetary gearing is rotated as a result of the elasticity of said spring.

5. In a crystal ball containing a plurality of objects such as figures mounted on corresponding ones of a plurality of longitudinal sticks, the crystal ball also including a base, a resilient plug mounted on said base, a transparent cover sealingly mounted on said resilient plug and a fixed base mounted on said resilient plug and including a ring gear, the improvement comprising a drive for vertically reciprocating the objects and the longitudinal sticks, the drive comprising:

a planetary gearing mounted on said fixed base and including three planetary gears meshing with said ring gear and meshing with a central drive gear, each of said planetary gears having an upper side and an upright member extending upwardly from said planetary gear upper side and having a bevelled upper surface;

means for rotating said central drive gear;

a revolving disk containing a plurality of bores spaced apart on a peripheral portion thereof, each bore corresponding to an upright member which extends through said bore; and a mantle having an annular base mounted on a peripheral portion of said revolving disk, said mantle having an upper surface, said mantle defining a space therebelow in which said upright members on said planetary gears are located; and three bulgy cylinders mounted to said upper surface of said mantle corresponding to said upright members on said planetary gears, said bulgy cylinders having an opening through which the longitudinal sticks mounting the objects is inserted so that the ends of the longitudinal sticks are in contact with the corresponding ones of said beveled upper surfaces of said upright members of said planetary gears.

* * * * *